Sept. 14, 1948. G. H. HUFFERD ET AL 2,449,481
VALVE
Filed May 18, 1944
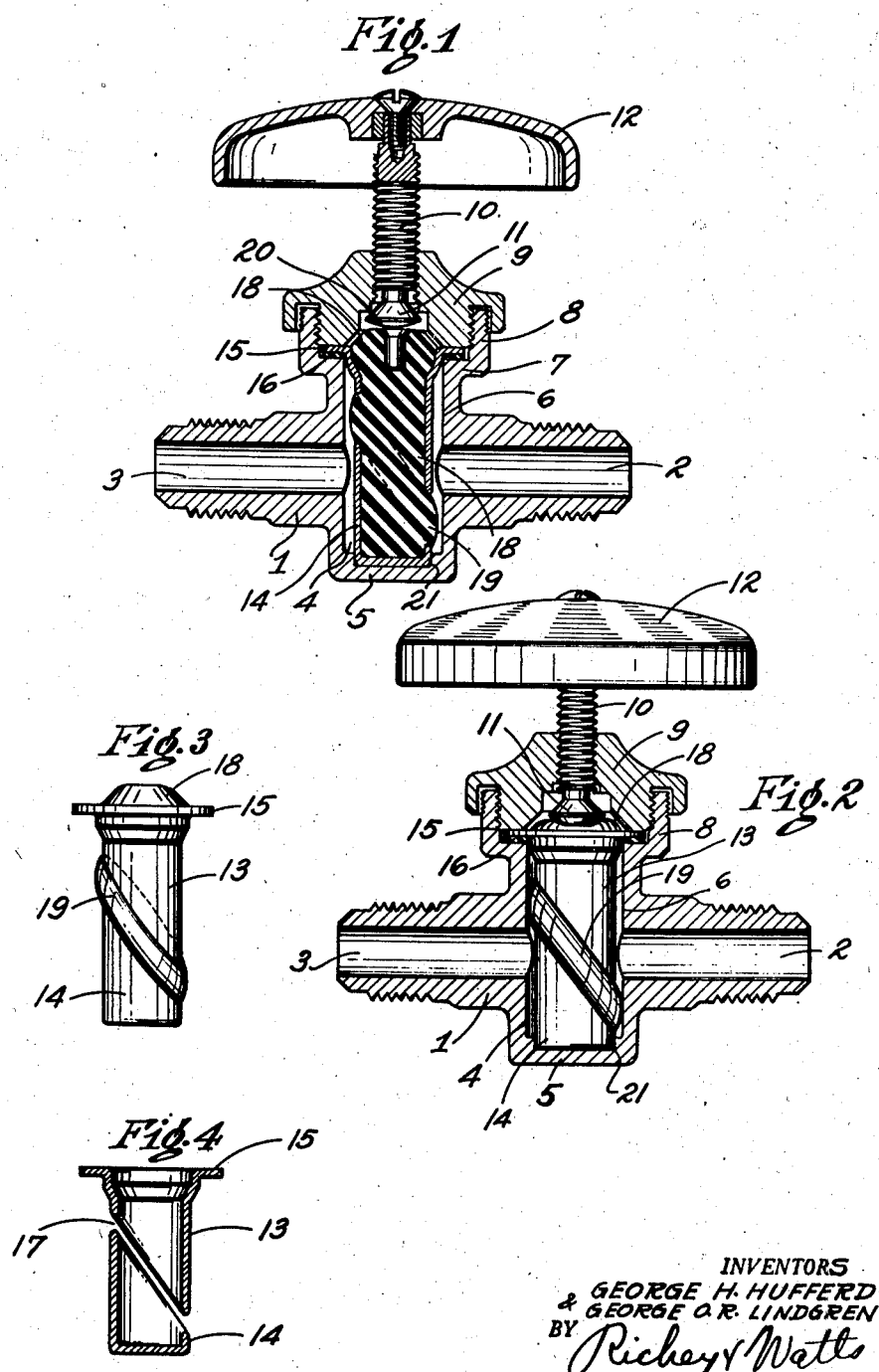

Patented Sept. 14, 1948

2,449,481

UNITED STATES PATENT OFFICE 2,449,481

VALVE

George H. Hufferd, Shaker Heights, and George O. R. Lindgren, Willoughby, Ohio, assignors to The Weatherhead Company, Cleveland, Ohio, a corporation of Ohio Application May 18, 1944, Serial No. 536,070

10 Claims. (Cl. 251—114)

This invention relates generally to the valve art and particularly to a new packless valve in which the plug is deformable radially when pressure is applied axially thereto.

The principal objects of this invention are to minimize the amount of deformation of the plug required to open and close a given area of valve opening; to prevent relative sliding movement between the deformable plug and other parts of the valve while effectively sealing the valve in closed position; and to decrease the cost and increase the durability of the valve. Other objects will appear hereinafter.

In the drawings accompanying and constituting a part of this specification;

Fig. 1 is a central, cross sectional view through one form of valve embodying the present invention, with the parts in valve-open position;

Fig. 2 is a view similar to Fig. 1 but with certain parts shown in elevation and the valve shown in closed position;

Fig. 3 is an elevational view of the plug of Figs. 1 and 2, turned slightly about its axis; and Fig. 4 is a central sectional view of certain parts of the plug of Figs. 1 to 3.

The valve illustrated in the drawings comprises a valve body 1 provided with fluid inlet and outlet passages 2 and 3, and a plug receiving recess 4. In the embodiment illustrated the inlet and outlet passages 2 and 3 are axially aligned, and are of somewhat smaller diameter than the recess 4. This recess 4 preferably extends at right angles to the center line of passages 2 and 3, and is defined by an end wall 5 and a cylindrical wall 6. A packing seat 7 surrounds the open end of recess 4 and annular flange 8 which extends outwardly beyond seat 7 is threaded to receive cap 9. A valve stem 10 is threaded through a central opening in cap 9 and carries an enlarged head 11 at its inner end and a handle 12 at its outer end.

The valve plug comprises a cup composed of two tubular, axially spaced parts 13 and 14. The part 13 has an outstanding annular flange 15 which, in the assembled valve, is pressed against packing 16 by an opposed portion of cap 9, and part 14 has a closed end which seats in and closely fits, a socket 21 in end wall 5. The cup parts 13 and 14 may be made by cutting a tubular cup into two parts, as is indicated by the space 17 in Fig. 4. The cup parts 13 and 14 are filled with material 18 which is bonded thereto and which will deform when pressure is applied thereto, for example, compounds of natural rubber or synthetic rubber. Preferably, this compound 18 is molded in place and bonded to cup parts 13 and 14 while they are axially aligned but spaced apart, substantially as shown in Fig. 3, and the molded material preferably projects beyond the outer surface of the cup in the form of a band 19 having a rounded outer surface. The outer surface of the band 19 may be straight and flush with the outer surface of the cup, if desired. The molded material 18 projects beyond flange 15 of cup part 13 and preferably carries a wear insert 20 to engage the rounded surface of valve stem head 11.

In the preferred embodiment, as illustrated, the cup parts 13 and 14 are separated in a plane inclined to the axis, so that the portion 19 has an elliptical shape and passes below the inlet passage 2 and above the aligned outlet passage 3. Thus when the material 18 is deformed to bring the band 19 into circumferential contact with the cylindrical wall 6, the band 19 lies between passages 2 and 3 and divides the recess into two separate chambers communicating respectively with those passages. This arrangement has not only the advantage of permitting the passages 2 and 3 to be axially aligned, thereby making the valve more compact and facilitating the manufacturing operations, but also increases the circumferential length of the band 19, thereby decreasing the radial distance the band 19 must move between full open and full closed positions in order to obtain a given area of opening of the valve.

When the above described valve parts are assembled in valve-open position, substantially as shown in Fig. 1, the cap 9 presses flange 15 of the cup part 13 of the plug against packing 16 so that the valve recess 4 is sealed from the cap 9 and stem 10, and no packing is needed to engage the movable stem. The part 14 of the cup is seated in the socket 21 in the end wall 5, and the portion 19 of the molded material between the cup parts is out of contact with the cylindrical wall of recess 4. When the stem 10 is screwed inwardly through cap 9, the head 11 of the valve stem exerts pressure on the insert 20, which transmits the pressure to the rubber-like material. Since this material is not compressible, but is deformable, it deforms through the annular space between the adjacent ends of the cup parts 13 and 14 and engages the cylindrical wall 6 of recess 4 with fluid sealing contact. Actuation of valve stem 10 in the opposite direction will relieve the deforming pressure applied to the molded material 18 and permit that material to resume its original position, substantially as shown in Fig. 1, whereupon fluid may flow between passages 2 and 3 through the recess 4, which is in communication with both of those passages.

The radial distance through which the outer surface of the band 19 must move from fully open to fully closed position is extremely small with the preferred proportions of the parts. For example, if the outlet passage 3 has an internal diameter of 1/2 of an inch, the recess 4 has an internal diameter of 3/4 of an inch, and the band 19 is arranged at an angle of about 35 degrees to the axis of the plug, an area of opening equal to the area of the outlet passage 3 is obtained by a movement of the band 19 inwardly from the wall 6 through slightly more than .03 of an inch. A slightly greater movement is ordinarily desirable to minimize the flow resistance of the valve, but it is apparent that the valve of the present invention, when properly proportioned, exerts relatively low deforming stresses on the rubber or rubber-like material 18 so that the valve may be operated for long periods of time without deterioration of the material 18.

Valves embodying the present invention possess many other advantages which will be obvious to those skilled in the art. Packing for the valve stem is eliminated without the use of a diaphragm or the like. The valve is quite inexpensive to construct and its parts are capable of long extended use without replacement. The recess 4 may be made by a simple boring operation. The only sealing part which moves is the moldable material 18 which is deformed through the space between parts 13 and 14 of the cup and the sealing action results from the engagement of that material with the cylindrical surface 6 of the recess 4, without sliding or wiping movement against the surface 6. Obviously, the sealing area and pressure may be varied within a wide range by varying the pressure axially applied to the molded material by handle 12. Ordinarily, however, there is no tendency for the valve to stick in closed position when the pressure is relieved, since the band 19 does not engage the edges of the openings of the conduits 2 and 3, or other sharp members which might press into and grip the material. In the event the valve is used with high pressures and it is desired to make certain the valve opens immediately upon actuation of the handle, a swivel connection of any desired type may be placed between the bead 11 and insert 20. The cup parts 13 and 14 are maintained in substantial alignment under axially and laterally applied pressure by reason of the clamping action exerted by the cap 9 on part 13, the seating of part 14 in the depression 21 in the end wall 5, and the circumferential engagement of the ring 19 of molded material on the cylindrical surface 6. As a result, any tendency of the fluid in inlet passage 2 to tip or dislodge the plug is effectively resisted by the support afforded by the cup parts and the internal pressure on the molded material.

The cup, consisting of parts 13 and 14, may be made by a drawing operation from a piece of thin metal, for example, deep drawing steel about 1/16" in thickness has been found to be suitable. Then the cylindrical article may be severed diagonally, as shown in Fig. 4, and any suitable moldable compound of natural rubber or synthetic rubber may be attached to and molded in these parts to form the plug shown in Figs. 1, 2 and 3.

It will be noted that the flange 8 of Figs. 1 and 2 is exteriorly threaded but that the cap carries no threads for engagement therewith. It will be understood that, if desired, the cap may be provided with threads to engage the exterior threads on flange 8, in which case the threads on the cap which engage the interior threads on flange 8, as appears in Figs. 1 and 2, will be omitted.

It will be understood that the inlet and outlet passages may open through the cylindrical wall 6 of the recess 4 at places other than the opposed places, as shown in Figs. 1 and 2, provided that the circumferential space between opposed ends of the tubular parts 13 and 14 of the cup can be so placed that the rubber-like material deformed therethrough will engage the cylindrical wall 6 between said passages and divide the recess 4 into separate chambers communicating respectively with those passages.

Having thus described the invention so that others skilled in the art may be able to understand and practice the same, we state that what we desire to secure by Letters Patent is defined in what is claimed.

What is claimed is:

1. A valve comprising a body having a plug recess defined in part by a cylindrical side wall and an end wall, said body being formed with inlet and outlet openings communicating with said recess, a cylindrical plug in said recess, said plug comprising tubular members separated by a circumferential space and deformable rubber-like material filling said members and projecting through said space, and means attached to said body and engageable with one end of said rubber-like material for exerting pressure endwise on said material and thereby deforming it through said space into circumferential fluid sealing engagement with said cylindrical wall between said inlet and outlet openings to prevent fluid flow through said body.

2. A valve plug comprising a cup consisting of aligned tubular members disposed with their opposed ends separated by an annular space, one member having its remote end closed and the other member having its remote end open, and deformable, rubber-like material substantially filling said members and said space.

3. A valve plug comprising tubular members disposed with their adjacent ends separated by an axially short annular space, deformable, rubber-like material substantially filling said members and said space, one member having its remote end closed and the other member having its remote end open, and a pressure receiving insert in said material at the said remote open end of the said other member.

4. A valve comprising a body having walls defining a plug recess, said body being formed with inlet and outlet openings communicating with said recess, a plug disposed in said recess and spaced from the wall thereof between said inlet and outlet openings, providing a fluid passage through said body, said plug including a deformable portion adapted to engage the wall of said recess between said inlet and outlet openings, means for applying pressure to the plug to expand said deformable portion into contact with the wall of said recess to seal the fluid passage between said inlet and outlet openings, the portions of said plug aligned with said inlet and outlet openings being less deformable than said deformable portion and remaining spaced from the edges of said openings when said deformable portion is pressed into sealing engagement with said wall.

5. A valve comprising a body having walls defining a plug recess, said body being formed with inlet and outlet openings communicating with said recess, a plug disposed in said recess and spaced from the edges of said openings and from the wall of said recess between said openings so as to define a fluid passage through said recess, said plug including sheathing members aligned with said inlet and outlet openings and having edges spaced apart defining a space aligned with the wall of said recess between said inlet and outlet openings, deformable material filling said sheathing members and said space and means for exerting pressure on said deformable material to cause the same to be deformed through said space into sealing engagement with the wall of said recess between said inlet and outlet openings to prevent fluid flow through said recess between said openings.

6. A valve comprising a body having walls defining a plug recess, said body being formed with inlet and outlet openings communicating with said recess, a plug disposed in said recess and spaced from the edges of said openings and from the wall of said recess between said openings so as to define a fluid passage through said recess, said plug including metal sheathing members aligned with said inlet and outlet openings and having edges spaced apart defining a space aligned with the wall of said recess between said inlet and outlet openings, deformable material filling said metal sheathing members and said space and means for exerting pressure on said deformable material to cause the same to be deformed through said space into sealing engagement with the wall of said recess between said inlet and outlet openings to prevent fluid flow through said recess between said openings.

7. A valve comprising a body having a plug recess defined in part by a cylindrical side wall, said body being formed with inlet and outlet openings through said side wall communicating with said recess, a plug disposed in said recess including substantially cylindrical sheathing portions spaced radially from the wall of said recess, parts of said sheathing portions being aligned radially with said inlet and outlet openings, said portions having edges spaced from each other defining an annular space aligned radially with said wall between said inlet and outlet openings, deformable material disposed in said sheathing members and said space, the deformable material in said space being normally spaced radially from said cylindrical wall and defining a fluid passage between said inlet and outlet openings and means for applying pressure to said deformable material to deform the same through said space into engagement with said cylindrical wall to close the fluid passage between said inlet and outlet openings.

8. A valve comprising a body having a plug recess defined in part by a cylindrical side wall and an end wall, said body being formed with inlet and outlet passages communicating with said recess, a cylindrical plug in said recess having one end engaging said end wall and the other end exposed, said plug being spaced from said cylindrical side wall and defining a fluid passage between said inlet and outlet openings, said plug including metal portions aligned radially with the edges of said inlet and outlet openings and deformable material aligned radially with said cylindrical side wall between said inlet and outlet openings and means for exerting pressure on the exposed end of said plug to deform said deformable material radially outward into circumferential sealing engagement with said cylindrical wall between said inlet and outlet openings.

9. A valve comprising a body having a plug recess defined in part by a cylindrical side wall and having inlet and outlet passages through said wall at spaced apart places, a plug in said recess spaced radially from said side wall to define a fluid passage through said recess between said inlet and outlet passages, said plug having sheathing portions aligned radially with said inlet and outlet passages and having a circumferential deformable portion aligned radially with said side wall and passing between said inlet and outlet passages and means for deforming said portion into circumferential fluid sealing engagement with said cylindrical wall to prevent fluid flow through said recess between said inlet and outlet passages.

10. A packless valve comprising a valve body formed with a recess and inlet and outlet passages opening into said recess, said body having walls defining said recess and separating said inlet and outlet passages, a cap secured to said body, a valve stem extending through said cap, a valve plug secured to said valve body and sealing said recess from said valve stem, said plug having sheathing portions spaced from and radially aligned with said inlet and outlet openings and a deformable portion spaced from and aligned radially with the walls of said body between said inlet and outlet passages and means for applying pressure to said plug through said stem to expand said deformable portion into sealing engagement with said walls to interrupt fluid flow between said inlet and outlet passages.

GEORGE H. HUFFERD.
GEORGE O. R. LINDGREN.

REFERENCES CITED

The following references are of record in the file of this patent:

UNITED STATES PATENTS

| Number | Name | Date |
|--------|------|------|
| 963,314 | Nolan | July 5, 1910 |
| 1,004,845 | Bohme | Oct. 3, 1911 |
| 1,521,081 | Dooling | Dec. 30, 1924 |
| 1,740,004 | Crowley | Dec. 17, 1929 |
| 2,134,277 | Sproull | Oct. 25, 1938 |
| 2,171,938 | Larry | Sept. 5, 1939 |
| 2,348,083 | McCabe | May 2, 1944 |